(12) United States Patent
Ito et al.

(10) Patent No.: US 7,918,301 B2
(45) Date of Patent: Apr. 5, 2011

(54) MOTORCYCLE INCLUDING ANTILOCK BRAKE SYSTEM AND BRAKE FLUID CONDUIT ROUTING STRUCTURE

(75) Inventors: Shinji Ito, Saitama (JP); Kenji Haraguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 12/322,584

(22) Filed: Feb. 4, 2009

(65) Prior Publication Data

US 2009/0243378 A1  Oct. 1, 2009

(30) Foreign Application Priority Data

Mar. 28, 2008 (JP) ................................. 2008-086513

(51) Int. Cl.
 *B62D 61/02* (2006.01)
(52) U.S. Cl. ......................................... 180/219; 303/137
(58) Field of Classification Search .......... 180/218–220; 303/9.64, 137

See application file for complete search history.

(56) References Cited

U.S. PATENT DOCUMENTS

| 4,633,726 A * | 1/1987 | Chang ........................ 74/473.11 |
| 4,766,982 A * | 8/1988 | Hayashi et al. ............ 188/181 A |
| 7,350,881 B2 * | 4/2008 | Asahi ............................ 303/137 |
| 7,712,844 B2 * | 5/2010 | Jensen et al. .................. 303/137 |

FOREIGN PATENT DOCUMENTS

JP  S58-188287  12/1983

* cited by examiner

*Primary Examiner* — Tony H. Winner
(74) *Attorney, Agent, or Firm* — Carrier Blackman & Associates, P.C.; William D. Blackman; Joseph P. Carrier (57) ABSTRACT

A motorcycle includes a head pipe that is disposed at a front portion of a vehicle body and makes front forks pivot, and a pair of left and right down tubes that extend downward from the head pipe and extend to the rear side of an engine under the engine, wherein connecting members for connecting brake hoses that are formed of elastic members to respective brake pipes that are formed of metal pipes are disposed behind the head pipe, and the brake hoses that extend from the connecting members to a brake for a front wheel extend frontward after passing between the pair of the left and right down tubes.

19 Claims, 9 Drawing Sheets

MOTORCYCLE INCLUDING ANTILOCK BRAKE SYSTEM AND BRAKE FLUID CONDUIT ROUTING STRUCTURE

CROSS-REFERENCE TO RELATED APPLICATIONS

The present invention claims priority under 35 USC 119 based on Japanese patent application No. 2008-2008-086513, filed on Mar. 28, 2008. The entire subject matter of this priority document, including specification, claims and drawings, is incorporated by reference herein.

BACKGROUND OF THE INVENTION

1. Field of the Invention

The present invention relates to a motorcycle having a brake control unit, specifically, an antilock brake system unit (hereinafter, referred to as "ABS unit") and an improved brake hose structure.

2. Description of the Background Art

There is a known motorcycle that is designed with a connecting member attached to a main frame pipe near a head pipe, for connecting a metal brake line, extending from a brake control unit, to a flexible brake line extending to a front wheel brake (For example, see published Japanese Patent Document JP-U No. S58-188287).

However, in the structure of the known art, since the connecting member is mounted on the main pipe at an upper side thereof, a length of the brake hose, extending from the connecting member to the front wheel brake, necessarily increases. When the length of the brake hose increases, there is a need to make the flexible brake hose with a large slack portion therein, so as to be able to accommodate left/right steering of a front wheel, or expansion and contraction of the front forks, and thus, an external appearance of the known motorcycle is diminished by these large slack portions.

In addition, there is a known motorcycle with an ABS unit that automatically controls hydraulic pressure of a hydraulic brake under certain conditions, to effectively prevent a lock of the vehicle wheel when the brake operates. In the known motorcycle with the ABS unit, since a front brake lever and a rear brake pedal are separately connected to the ABS unit by respective brake lines, and since the front and rear brake calipers are also connected to the ABS unit by respective brake lines, the length of each of the brake lines increases and piping becomes complicated. Therefore, there is a need to simplify piping work, while improving the external appearance of the motorcycle.

SUMMARY OF THE INVENTION

Accordingly, an object of the present invention is to provide a motorcycle that is designed to make it easy to perform piping and improve external appearance by addressing the above-mentioned problems of the known art, and improving a brake hose structure.

In order to address the above-mentioned problem, an embodiment of the present invention provides a motorcycle including a head pipe that is disposed at a front portion of a vehicle body and pivotally supports front forks thereon, and a pair of left and right down tubes that extend downwardly from the head pipe and then extend rearwardly to a lower rear side of an engine, wherein a plurality of connecting members are disposed behind the head pipe for connecting brake hoses, that are formed of elastic members, to respective brake lines that are formed of metal pipes. In this embodiment, the brake hoses that extend from the connecting members to a front wheel brake extend frontwardly after passing between the left and right down tubes.

According to this structure, since the connecting members that connect the brake hoses that are formed of the elastic members to the respective brake lines that are formed of the metal pipes are disposed behind the head pipe, the connecting members are disposed not to be viewed well from the external side. Accordingly, the external appearance can be improved. In addition, since the connecting members are disposed behind the head pipe having a closer distance to the front wheel brake and the brake hoses extending from the respective connecting members to the front wheel brake extend frontward after passing between the pair of the left and right down tubes, the lengths of the brake hoses extending to the front wheel brake can be reduced. By reducing the lengths of the brake hoses, the lengths of the paths of the brake lines formed of the metal increase and thus the liquid loss caused by expansion can be suppressed.

In addition, in the present invention, it is preferable that the brake lines are bound into a plurality of bundles and extend to come out through a rear side of the vehicle body, the connecting members are arranged in an upward and downward direction behind the head pipe, the brake hoses extending from the connecting member that is disposed at an upper side extend upward along the head pipe and is connected to a master cylinder provided on a handlebar, the brake hoses extending from the respective connecting members that are disposed at a lower portion extend downward along the front forks and are connected to the front wheel brake.

According to this structure, the connecting members are arranged in the upward and downward direction and the brake hose extending from the connecting member that is disposed at the upper side is connected to the master cylinder provided on the handlebars. In addition, the brake hoses extending from the respective connecting members that are disposed at the lower side are connected to the front wheel brake. Therefore, the external appearance can be improved and the lengths of the brake hoses can be reduced. Further, since the brake lines are bound into the plurality of the bundles and extend to come out through a rear side of the vehicle body, the external appearance can be improved and the piping work can be easily performed.

Further, in the structure according to the selected embodiment, rear ends of the brake lines may be connected to a brake hydraulic control unit disposed at a rear side of the vehicle body.

According to this structure, since the external appearance can be improved and the brake hoses can be shortened, the lengths of the paths of the metal pipes increase and thus the liquid loss caused by expansion can be suppressed even when rear ends of the brake lines are connected to the brake hydraulic control unit disposed at the rear side of the vehicle body and thus the distance between the front wheel brake and the brake hydraulic control unit increases.

According to the selected embodiment, since the connecting members that connect the brake hoses that are formed of the elastic members to the respective brake lines that are formed of the metal pipes are disposed behind the head pipe, the connecting members are disposed not to be viewed well from the external side. Accordingly, the external appearance can be improved. In addition, since the connecting members are disposed behind the head pipe having a closer distance to the front wheel brake and the brake hoses extending from the respective connecting members to the front wheel brake extend frontward after passing between the pair of the left and right down tubes, the lengths of the brake hoses extending to the front wheel brake can be reduced. By reducing the lengths of the brake hoses, the lengths of the paths of the brake lines formed of the metal increase and thus the liquid loss caused by expansion can be suppressed.

In addition, the connecting members are arranged in the upward and downward direction and the brake hose extending from the connecting member that is disposed at the upper side is connected to the master cylinder provided on the handlebars. In addition, the brake hoses extending from the respective connecting members that are disposed at the lower side are connected to the front wheel brake. Therefore, the external appearance can be improved and the lengths of the brake hoses can be reduced. Further, since the brake lines are bound into the plurality of the bundles and extend to come out through a rear side of the vehicle body, the external appearance can be improved and the piping work can be easily performed.

Further, since the external appearance can be improved and the lengths of the brake hoses can be shortened, the lengths of the paths of the metal pipes increase and thus the liquid loss caused by expansion can be suppressed even when rear ends of the brake lines are connected to the brake hydraulic control unit disposed at the rear side of the vehicle body and thus the distance between the front wheel brake and the brake hydraulic control unit increases.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
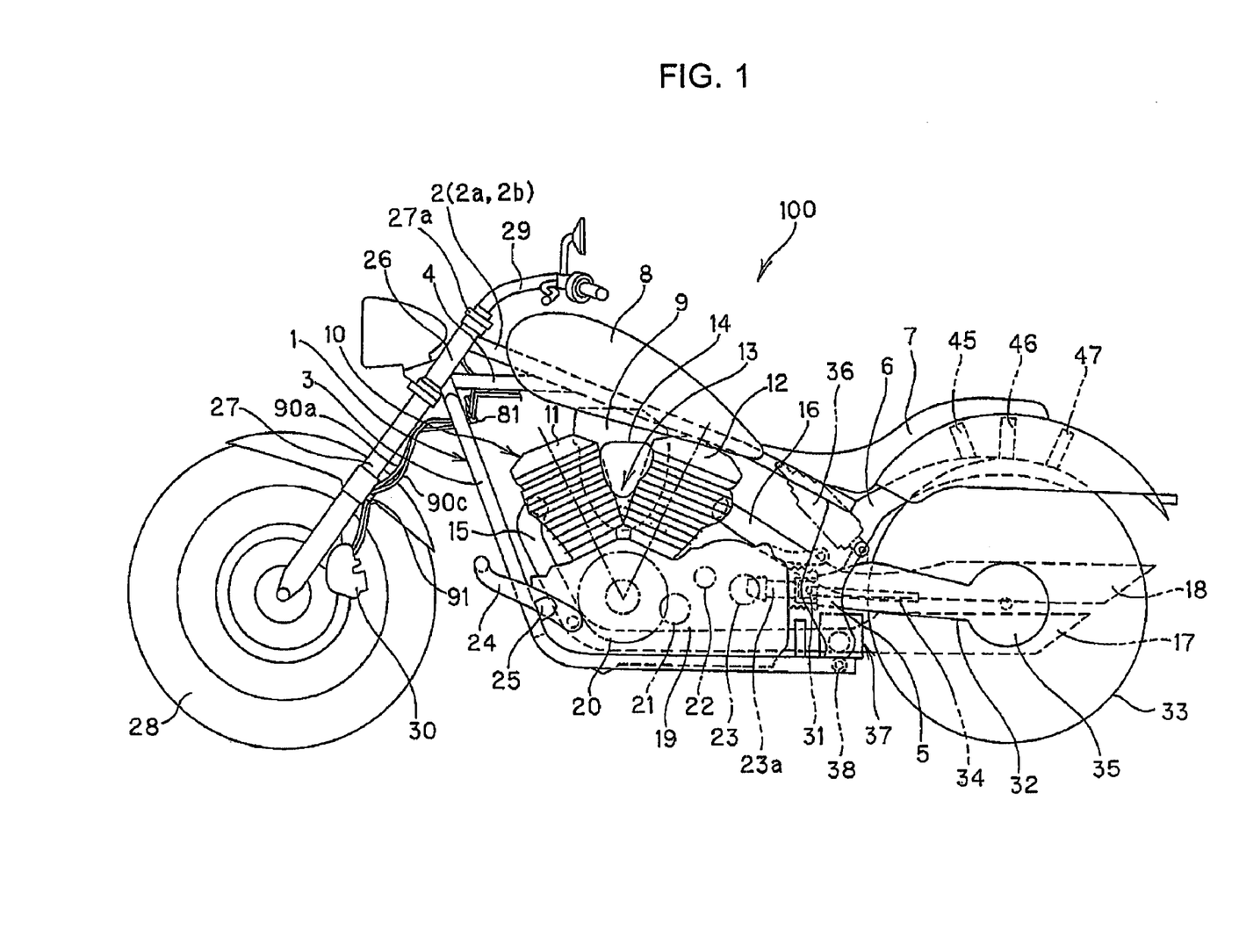
FIG. 1 is a left side elevational view of a motorcycle according to a selected illustrative embodiment of the present invention.

An illustrative embodiment of the present invention will be described below with reference to drawings. FIG. 1 is a left side view of a motorcycle according to an embodiment of the present invention. In addition, in the drawings, the left, right, upward, downward, front, and rear indicate directions with reference to a vehicle body.

A vehicle body frame 1 of a motorcycle 100 includes a head pipe 26 that is disposed at a front portion of a vehicle body, a main frame member 2 that extends rearwardly from the head pipe 26, and a pair of down tubes 3 that extend obliquely downwardly and rearwardly from the head pipe 26, and thus extend toward a lower-rear portion of the vehicle. The vehicle body frame 1 also includes a gusset member 4 that extends rearwardly from the head pipe 26, and medial frame members 5 that connect a rear end of the main frame member 2 to rear ends of the down tubes 3. These pipes are arranged in a substantially quadrilateral frame shape when viewed from a side thereof.

The medial frame members 5 have a pair of left and right seat stays 6 that extend further rearwardly from a connecting portion with the main frame member 2, and a seat 7 is supported on the medial frame members 5. A fuel tank 8 is supported on the main frame 2 in front of the seat 7. An air cleaner assembly 9 is disposed below the fuel tank 8.

An engine 10 is disposed in a space surrounded by the main frame member 2, down tubes 3, and medial frame members 5. In the depicted embodiment, the engine 10 is a V-type 2-cylinder engine that includes a crankcase 19, and a pair of front and rear cylinders 11 and 12 that extend upwardly from the crankcase 19. The air cleaner assembly 9 is installed in a V-bank 13, that is a V-shaped space defined between the front and rear cylinders 11 and 12. The front and rear cylinders 11 and 12 introduce an air/fuel mixture through upper portions thereof, burn the air/fuel mixture in combustion chambers, and discharge the burned mixture through exhaust pipes 15 and 16. The exhaust pipes 15 and 16 come out through a right side of the vehicle body, and are respectively connected to mufflers 17 and 18.

In FIG. 1, reference numerals 20, 21, 22, and 23 indicate a crankshaft, a main shaft, a counter shaft, and an output gear. Reference numeral 24 indicates a gearshift pedal that is pivotally coupled to a front-lower side surface of the crankcase 19. Reference numeral 25 indicates steps that are attached to the down tubes 3 near the change pedal 24. All of the shafts are minimally and schematically illustrated. That is, all of the shafts are actually designed to be engaged with each other by gears arranged on a gear shaft, and thus constitute a gear train to sequentially transmit torque.

Front forks 27, that function as both a transmission unit of steering force and a suspension unit, are rotatably supported on the head pipe 26. A front wheel 28 is rotatably attached to lower ends of the front forks 27. A top bridge 27a is connected to upper end portions of the front forks 27. Steering handlebars 29 are attached on the top bridge 27a. Reference numeral 30 indicates a front wheel brake caliper (brake) that is a hydraulic disk brake member.

A pivot shaft 31 is rotatably installed on middle portions of the medial frame members 5 in an upward and downward direction, and rear forks 32 are reciprocally vertically movable on the pivot shaft. A rear wheel 33 is supported on rear ends of the rear forks 32, and is shaft-driven through the driveshaft 34 installed on the rear forks 32 and a gearbox 35. Torque of the driveshaft 34 is transferred through an output shaft 23a.

Although not shown in FIG. 1, a rear wheel brake that is a hydraulic disk brake is also installed on the rear wheel 33. The rear wheel break operates by the manipulation of a brake pedal (not shown). The rear forks 32 are designed such that impact thereof is absorbed by a rear shock absorber 36 that interconnects middle portions of the rear forks 32 and the main frame member 2.

A brake control unit (brake hydraulic control unit) 37 is installed under the pivot shaft 31. The brake control unit 37 is supported on a lower cross pipe 38 attached on the rear end portions of the down tubes 3 in an inner space of the medial frame members 5. The brake control unit of this embodiment is a front/rear wheel ABS type. The brake control unit 37 automatically controls the operation of the front and rear brakes 28, 33 by controlling hydraulic pressure of the front wheel brake 28 and the rear wheel brake 33 under conditions where the front and rear wheels 28 and 33 are likely to be locked. Necessity for using the ABS system is determined in accordance with detected information such as a vehicle speed and the like, and effectively prevents the front and rear wheels 28 and 33 from being locked.

Figure 2:
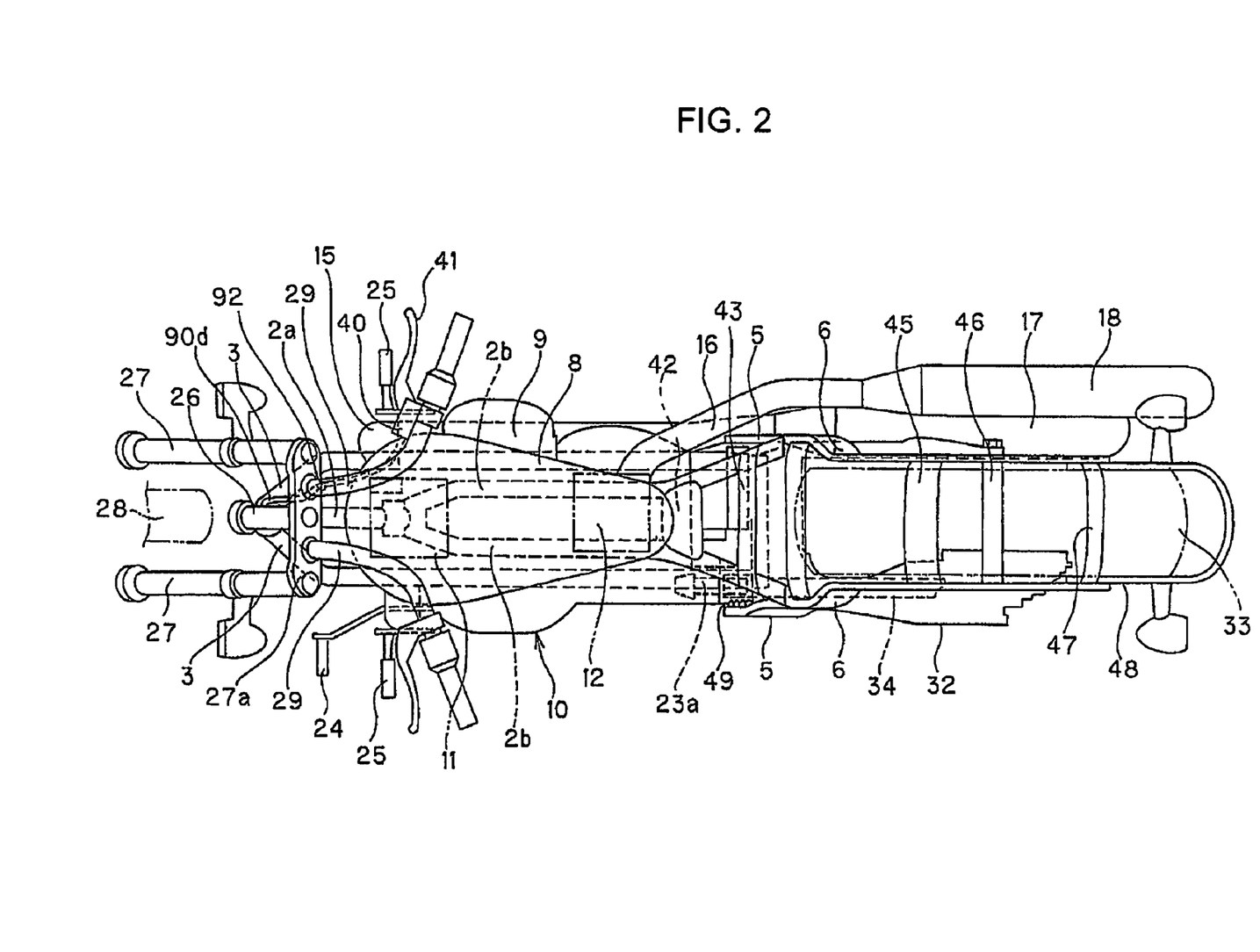
FIG. 2 is a top plan view of the motorcycle according to the selected embodiment.

FIG. 2 is a top plan view of the motorcycle 100 with the seat 7 omitted for illustrative purposes.

The front forks 27, the steps 25, the handlebars 29, the down tubes 3, the medial frame members 5, and the seat stays 6 are installed in pairs at left and right sides with reference to a longitudinal vehicle body center line (not shown) extending in the forward and backward direction. Further, the main frame member 2 is also paired at a rear-half portion thereof in the forward and backward direction. Meanwhile, the exhaust components, such as the exhaust pipes 15 and 16, and the mufflers 17 and 18, as well as the air cleaner assembly 9, are disposed to protrude outwardly from the right side of the vehicle body.

Reference number 40 indicates a front master cylinder that is installed near the right brake lever 41 of the right handlebar 29, and generates hydraulic pressure in accordance with the manipulation of the right brake lever 41. In addition, in addition, the reference numerals 45,46, and 47 indicate crossmembers installed between the left and right seat stays 6. Rear ends of the left and right seat stays 6 are interconnected by a connecting member 48, that is formed in an approximately U-shape when viewed from a top plane. A joint rubber boot 49 is attached on a joint portion of the driveshaft 34 installed on a left front end of the rear fork 32 to cover a joint portion between the driveshaft 34 and the output shaft 23a.

Figure 3:
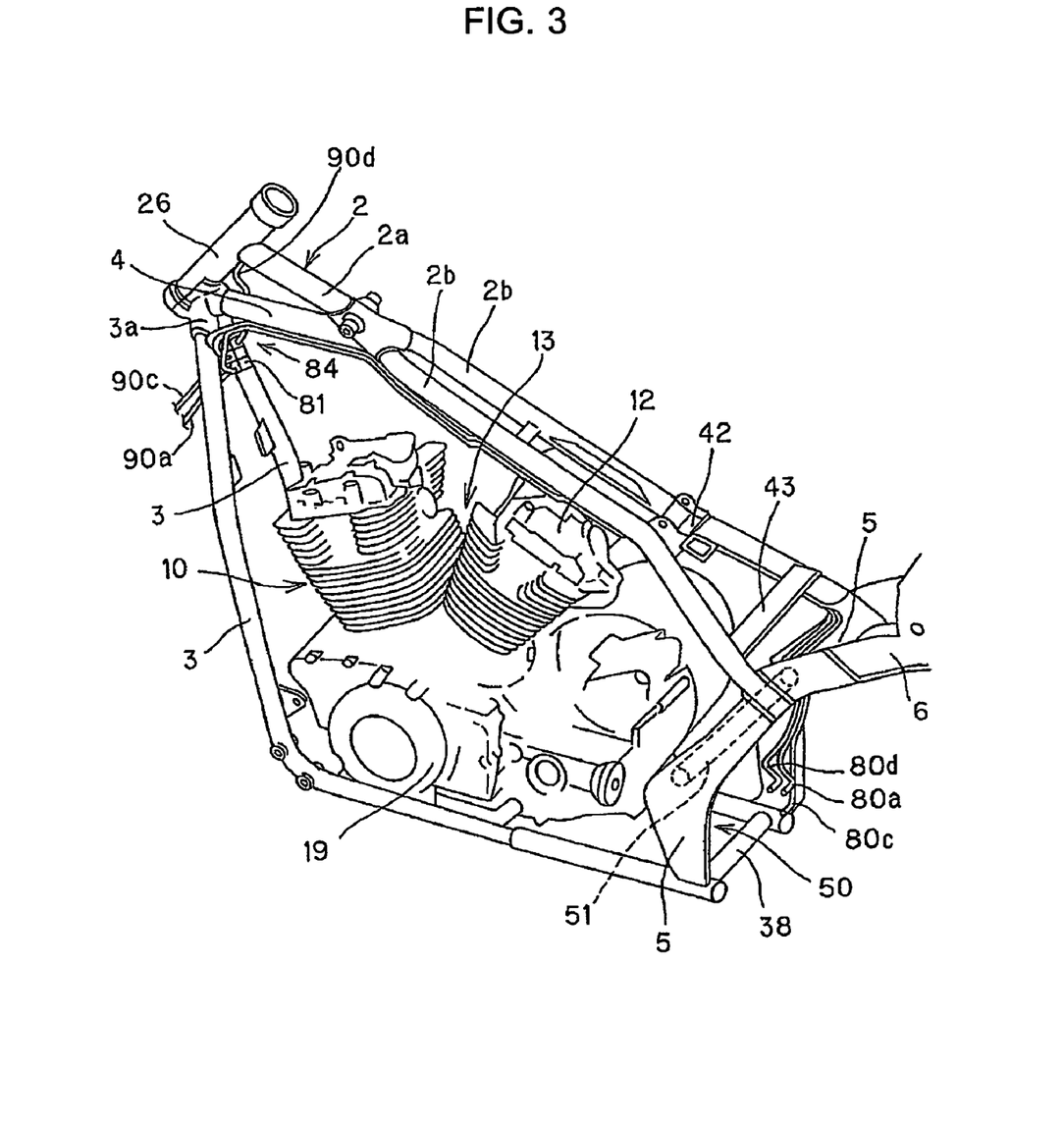
FIG. 3 is a perspective view of a vehicle body frame and an engine according to the selected embodiment.

FIG. 3 is a perspective view of the vehicle body frame 1 and the engine 10 when obliquely viewed from a vantage point above a left-rear side of the vehicle body. In FIG. 3, the air cleaner assembly 9 is omitted. The main frame member 2 includes a single front section 2a and a bifurcated rear section 2b that is divided into left and right parts, that are approximately parallel with each other. The left and right parts of the rear section 2b are interconnected by the crossmembers 42 and 43. A front end of the rear shock absorber 36 (see FIG. 1) is supported on the crossmember 42. The left and right parts of the rear section 2b extend further rearward from the crossmember 42 while diverging in the left and right direction, and are welded to outer upper potions of the left and right medial frame members 5.

The medial frame members 5 are plate-shaped members that are properly made through a proper method such as casting using a proper material having rigidity such as a variety of different kinds of metal including a light alloy. The medial frame members 5 are integrally formed with the seat stays 6. With reference to a boundary defined by a portion to which the rear ends of the main frame member 2 are connected, an upper portion forms the seat stays 6 that are curved and extend rearward.

Figure 4:
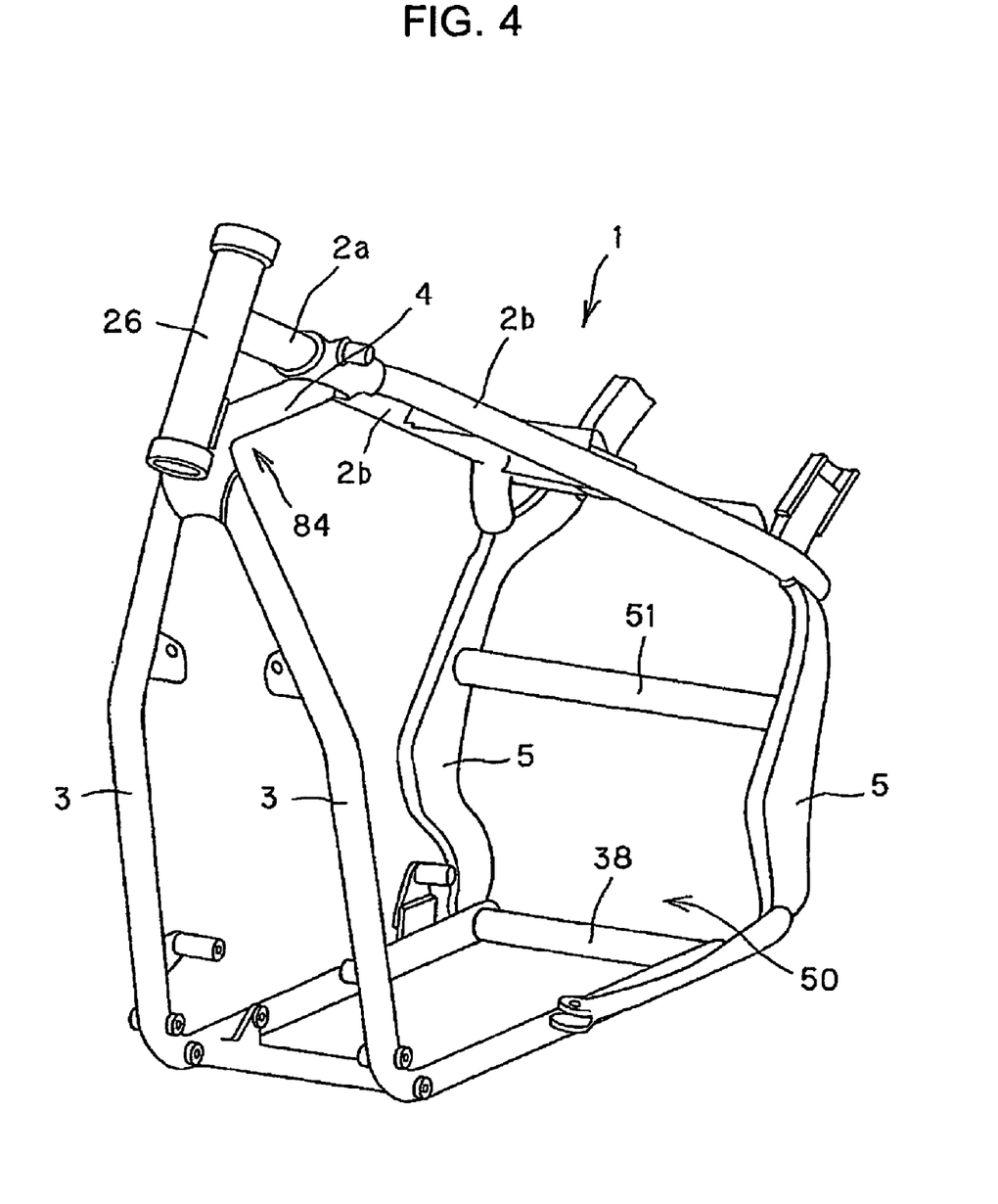
FIG. 4 is a perspective view of the vehicle body frame according to the selected embodiment, when obliquely viewed from a front side.

FIG. 4 is a perspective view of the vehicle body frame 1 when obliquely viewed from a front-left side of the vehicle body.

Middle portions of the left and right medial frame members 5 are connected to each other by an upper cross pipe 51 and lower end portions of the left and right medial frame members 5 are welded to respective rear end portions of the left and right down tubes 3. The rear end portions of the left and right down tubes 3 are interconnected by a lower cross pipe 38. By these vehicle body side members, a protected space 50 surrounded by the left and right medial frame members 5, upper cross pipe 51, and lower cross pipe 38 is formed. The brake control unit 37 (see FIG. 1) is disposed in the protected space 50.

Figure 5:
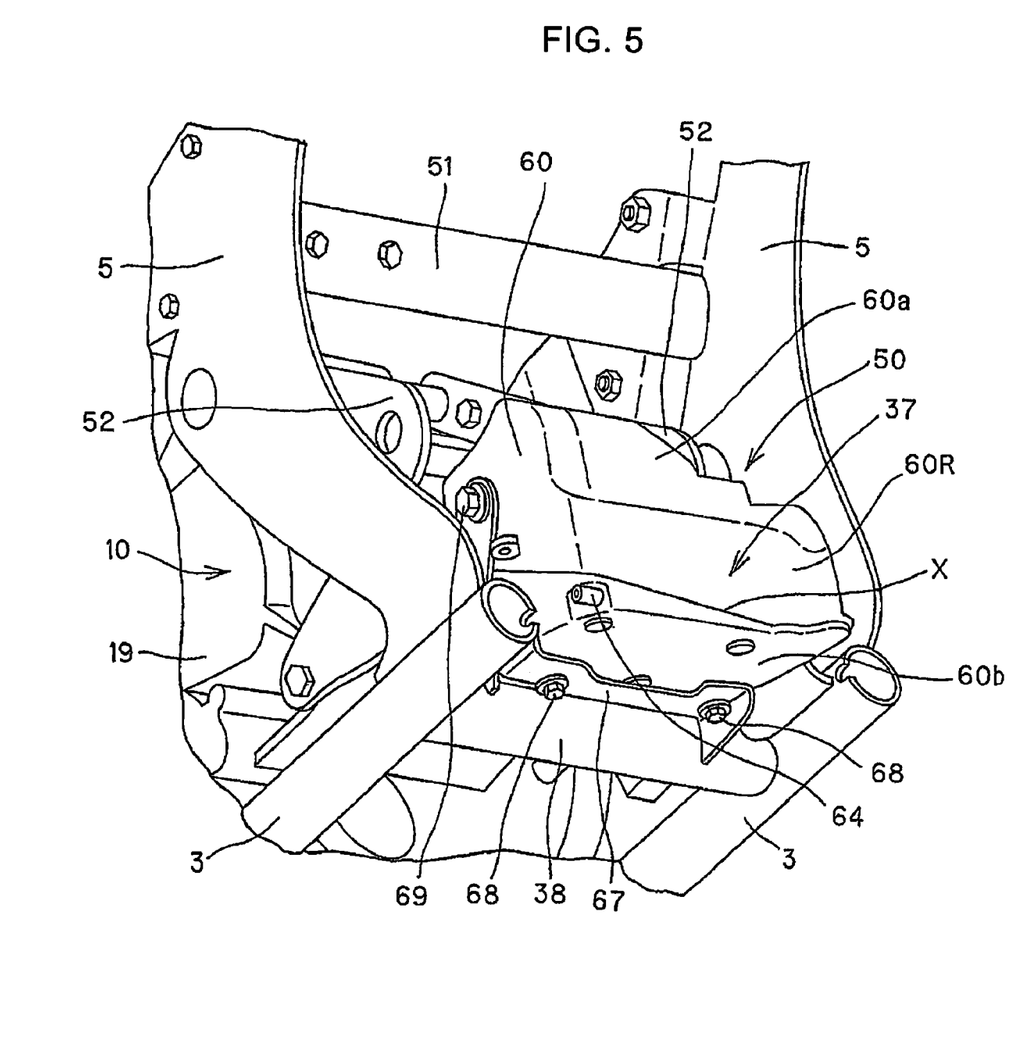
FIG. 5 is a perspective view of a vehicle body brake control unit according to the selected embodiment, when obliquely viewed from below a right-rear side thereof.
Figure 6:
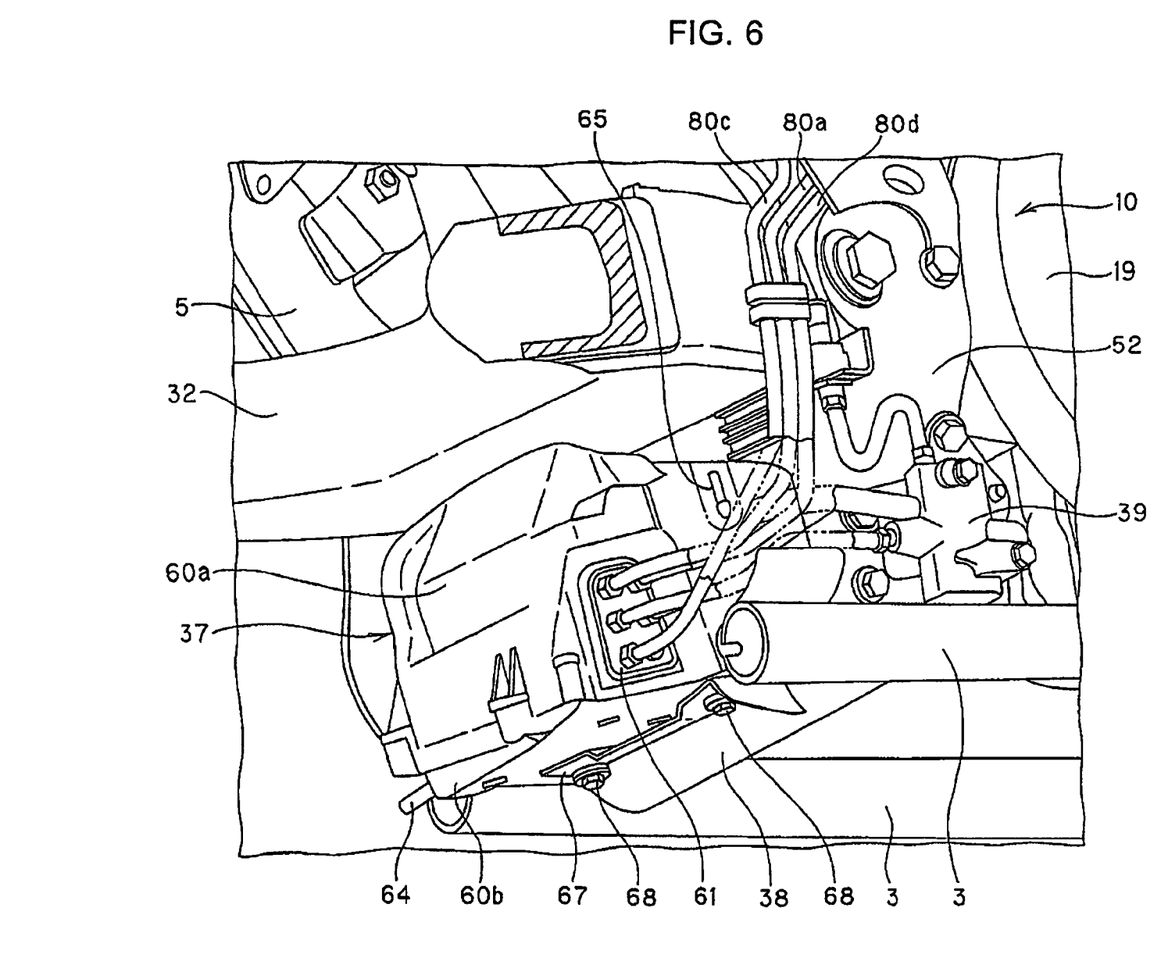
FIG. 6 is a perspective view illustrating a state where an upper case is removed from the brake control unit, for purposes of illustration.

FIG. 5 is a perspective view illustrating a state where the brake control unit 37 is attached to the frame 11 in the protected space 50, and is obliquely viewed from a vantage point below a left-rear side of the vehicle body. In FIG. 5, the rear fork 32 is omitted for illustrative purposes. FIG. 6 is a perspective view illustrating a state where the brake control unit 37 is disposed in the protected space 50, when obliquely viewed from a vantage point below a right-rear side of the vehicle body. In FIG. 6, the right center frame 5 is omitted for illustrative purposes.

As shown in FIG. 5, a pivot shaft supporting member 52 is attached to a rear end of the engine 10. The pivot shaft 31 (see FIG. 1) is disposed in parallel with the upper cross pipe 51 and suspended under the upper cross pipe 51 to the pivot shaft supporting member 52. The rear forks 32 shown in FIG. 6 are swingably attached to the pivot shaft 31.

As noted above, the protected space 50 is surrounded by the left and right medial frame members 5, upper cross pipe 51, and lower cross pipe 38, and the brake control unit 37 is disposed inside of the protected space 50.

The brake control unit 37 is disposed on an attaching latch (not shown) and is attached to the lower cross pipe 38 through a base plate member 67 that is stamped from a steel sheet. The base plate member 67 is formed approximately in an L-shape. A lower side of the base plate member 67 is fixed to the lower cross pipe 38 by welding. The brake control unit 37 is attached to the base plate member 67 by bolts 68, inserted through the lower side of the base plate member 67, and by bolts 69 inserted through a side portion of the vehicle body frame.

As described above, by disposing the relatively heavy brake control unit 37 in the protected space 50, it becomes possible to install the brake control unit 37 on an approximately central portion in the longitudinal direction of the vehicle body frame 1 (see FIG. 1) so that the brake control unit 37 is disposed near a center of the vehicle body, in order to help provide balance to the motorcycle 100 during operation thereof.

Further, by disposing the brake control unit 37 in the protected space 50, it becomes possible to prevent a lower portion of the brake control unit 37 from protruding toward the lower portions of the down tubes 3, and at the same time, to substantially cover and conceal the brake control unit 37 with the down tubes 3 and the medial frame members 5, so that it becomes possible that the brake control unit 37 is not seen from a side of the vehicle body (i.e., the brake control unit 37 can be disposed substantially out of sight).

Since the brake control unit 37 is disposed in the protected space 50 under the vehicle body, under certain environmental conditions, the brake control unit 37 may be exposed to water and/or mud thrown back from the front wheel 28 (see FIG. 1) during driving. Therefore, an outer side of the brake control unit 37 is covered with a water-resistant case 60 having a water-resistant property. The water-resistant case 60 is divided into upper and lower sections with reference to a dividing plane X. That is, as shown FIG. 6, the water-resistant case 60 includes an upper case 60a, a lower case 60b, and a pipe-supporting member 101 that is disposed to be fitted into the upper case 60a and lower case 60b. Each of the upper case 60a and lower case 60b is formed through a plastic resin molding process.

A drain port 64 is formed extending outwardly from the vehicle body on a rear end portion of a side surface of the lower case 60b, which defines a rear-lower side of the water-resistant case 60. The drain port 64 is formed in a pipe shape, protruding outwardly from the vehicle body. A drain tube (not shown) or the like is attached to the drain port 64.

Further, a breathing hole 65 is formed on a front end portion of the side surface of the upper case 60a, extending in the longitudinal direction of the vehicle body. In a state where the brake control unit 37 is attached to the base plate member 67, a bottom surface of the brake control unit 37 is inclined slightly downwardly towards the rear portion thereof. Therefore, a location of the drain port 64 becomes a lowermost end of the water-resistant case 60, and thus, any water entering the water-resistant case 60 can be discharged out of the case 60 through the drain port 64.

Figure 7:
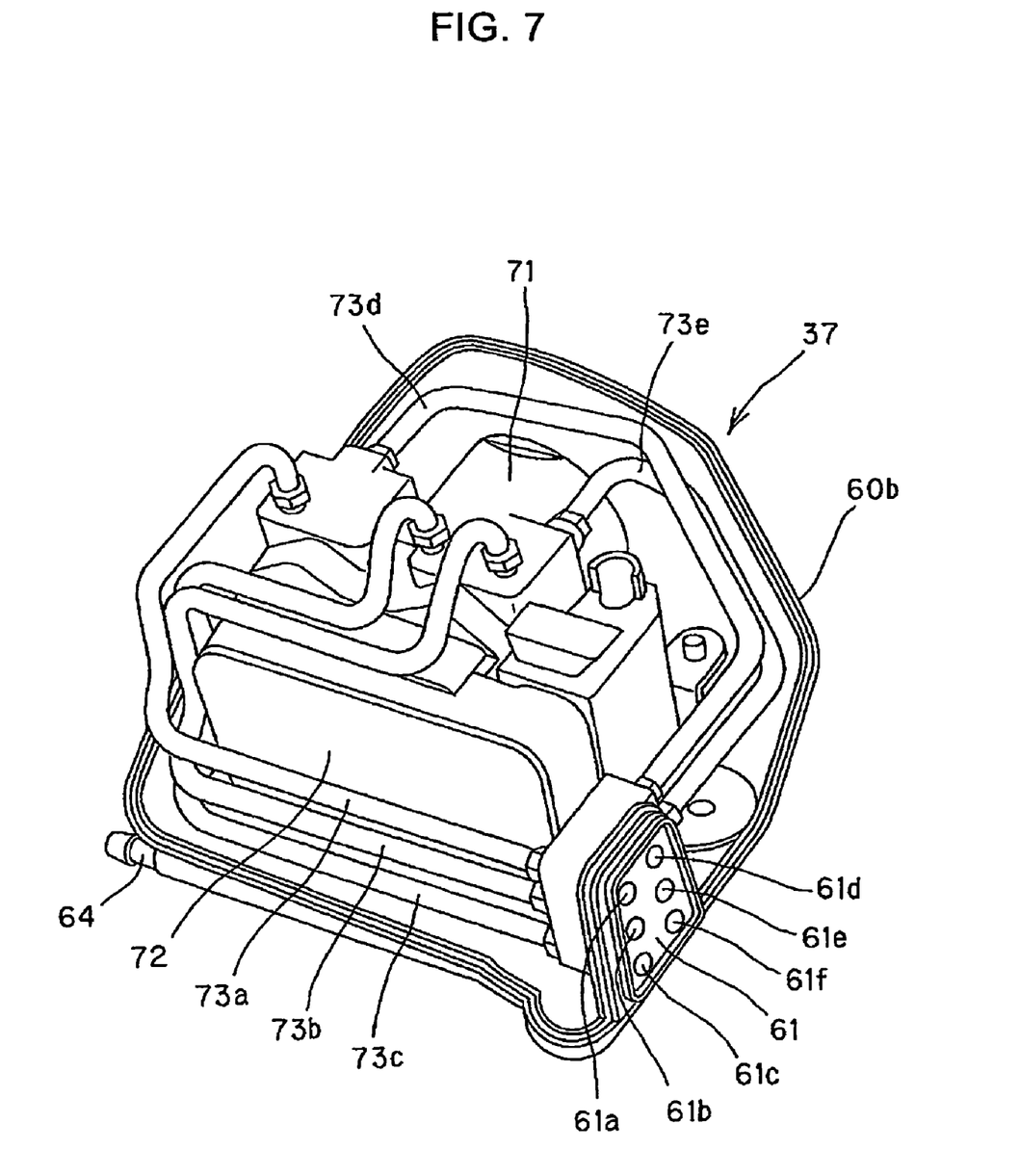
FIG. 7 is a view of a connecting member according to the selected embodiment when obliquely viewed from a left-rear side of the vehicle body.

FIG. 7 is a perspective view illustrating a state where the upper case 60a is omitted from the brake control unit 37 for illustrative purposes.

The pipe-supporting member 61 is formed substantially in a rectangular parallelepiped or box-like shape, and formed of metal. In addition, the pipe-supporting member 61 is provided with six through holes 61a, 61b, 61c, 61d, 61e, and 61f that are formed to extend from an outer side to an inner side of the water-resistant case 60.

An ABS modulator 71 and a control unit 72 are received in the water-resistant case 60 as component parts of the brake control unit 37.

Five brake lines 73a, 73b, 73c, 73d, and 73e are connected to the ABS modulator 71. In more detail, the brake line 73d is connected to the front master cylinder 40 (see FIG. 2), and the brake lines 73a, 73b, and 73c are connected the front brake caliper 30 (FIG. 1) and also to a control valve 39.

Meanwhile, electric wires (not shown) are connected to the control unit 72 for inputting signals from vehicle wheel speed sensors (not shown) detecting rotating states of the front and rear wheels 28 and 33, and for outputting signals such as ABS alarm signals and the like.

The control unit 72 controls the ABS modulator 71 according to the signals from the vehicle speed sensor. That is, the ABS modulator 111 pressure-feeds hydraulic brake fluid from a pump (motor pump) in the ABS modulator 71 to each of the brake lines 73a, 73b, and 73c in accordance with the signals from the control unit 72.

Each of the brake lines 73a through 73e is a metal pipe that has a smaller outer diameter than a rubber brake hose, and is not substantially expandable. These five brake lines 73a through 73e are fed into the water-resistant case 60, and respectively threadably connected to connecting openings (connecting openings that are close to the inside of the water-resistant case 60) of the five through holes 61a through 61e of the pipe-supporting member 61. The through hole 61f is for coupling the pipe-supporting member 61 to the attaching latch using a bolt (not shown).

Figure 8:
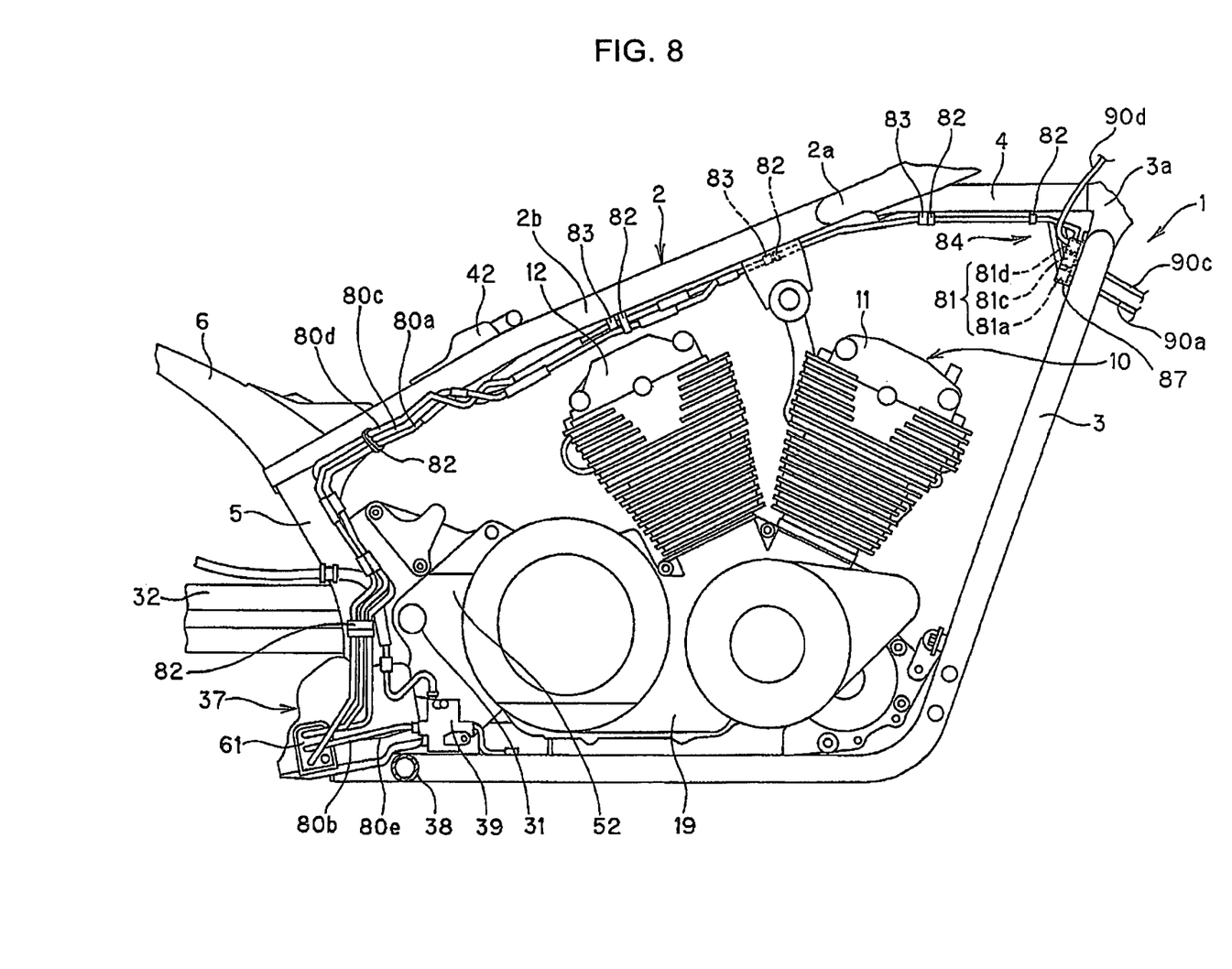
FIG. 8 is a piping diagram of brake lines according to the selected embodiment.

FIG. 8 is a piping diagram of brake lines. In FIG. 8, the right center frame 5 is omitted. The pipe-supporting member 61 is disposed on a rear-lower end of the vehicle body frame 1 and brake lines 80a, 80b, 80c, 80d, and 80e are connected to the pipe-supporting member 61. Each of the outer brake lines 80a through 80e is a metal pipe that has a smaller outer diameter than a rubber brake hose.

Among the brake lines 80a through 80e, the brake lines 80a, 80c, and 80d are arranged along an inner side of the right center frame 5 (not shown) with respect to the vehicle width direction, a lower side of the right part of the rear section 2b, a lower side of the crossmember 42, a lower side of the left part of the rear section 2b, and a lower side of the gusset member 4. In addition, the brake lines 80a, 80c, and 80d are connected to corresponding respective sections 81a, 81c, and 81d of a connecting port 81 (FIG. 9) disposed behind the head pipe 26.

The brake lines 80a, 80c, and 80d are bundled together by a plurality of clips 82 (four clips in this embodiment) that are disposed on a middle portion of the center frame 5, front, middle, and rear portions of the rear section 2b, and front and rear portions of the gusset member 4. The bundled brake lines 80a, 80c, and 80d are fixed to the main frame member 2 of the vehicle body frame 1 and the gusset member 4 by a plurality of pipe stays 83 (three pipe stays in this embodiment). These pipe stays 83 are formed to be one-touch-fixable to front and middle portions of the rear section 2b of the main frame member 2 and a rear portion of the gusset member 4.

Meanwhile, the brake line 80b is connected to the control valve 39.

Figure 9:
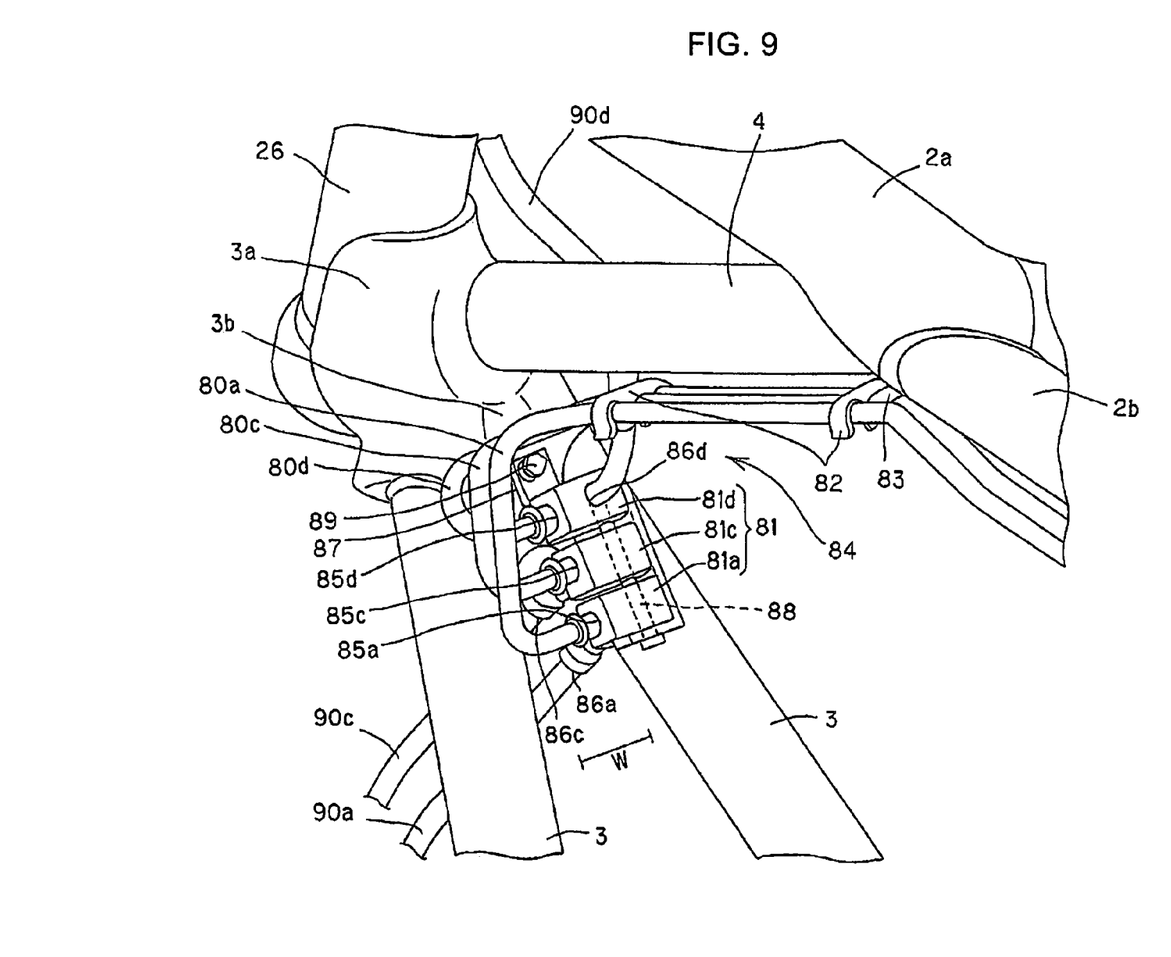
FIG. 9 is a simplified schematic diagram showing an arrangement of brake lines and brake hoses according to the selected embodiment.

FIG. 9 is a view of the connecting port 81, obliquely viewed from a left-rear side of the vehicle body.

As best seen in FIG. 9, a junction member 3a is integrally attached to a rear-lower portion of the head pipe 26 by welding. The junction member 3a may be formed from a stamped metal plate, and defines a junction between the head pipe 26, the left and right down tubes 3, and the gusset member 4. The pair of left and right down tubes 3 are connected to the junction member 3a and obliquely extend downwardly and rearwardly therefrom, and the gusset member 4 is connected to the junction member 3a and extends rearward. The junction member 3a has a recessed web portion 3b formed thereon between the left and right down tubes 3.

A junction space 84 is formed at a portion of the vehicle body frame behind the head pipe 26, and is surrounded by the junction member 3a, the pair of left and right down tubes 3, and the gusset member 4 extending rearwardly from the junction member 3a to meet the main frame member 2. This junction space 84 is formed in a substantially triangular shape when viewed from a side, but is not easily seen from an external vantage point. The connecting port 81 is disposed in the junction space 84. The connecting port 81 includes three connecting members 81a, 81c, and 81d that are formed in an approximately prismatic shape. Each of the connecting members 81a, 81c, and 81d has a length extending in a leftward and rightward direction. The connecting members 81a, 81c, and 81d are arranged in a stacked configuration along the down tubes 3.

The lowermost connecting member 81a has a pipe connecting hole 85a formed on a left side thereof and a hose connecting hole 86a formed on an oblique lower portion of a front side thereof. The uppermost connecting member 81d is disposed behind the recessed web portion 3b and has a pipe connecting hole 85d formed on a left side thereof and a hose connecting hole 86d formed on an oblique upper portion of a rear side thereof. The connecting member 81c is disposed between the connecting members 81a and 81d and has a pipe connecting hole 85c formed on a left side thereof and a hose connecting member 86c formed on an oblique lower portion of a front side thereof. These three connecting members 81a, 81c, and 81d are fixed to a bracket 87 by one bolt 88. In addition, the bracket 87 is fixed to the recessed web portion 3b of the junction member 3a by a bolt 89. By this structure, the hose connecting holes 86a and 86c are disposed below the recessed web portion 3b between the left and right down tubes 3 and obliquely opened forward and downward. In addition, the connecting port 81 is disposed in the junction space 84 that is surrounded by the head pipe 26, the junction member 3a, the pair of left and right down tubes 3, and the gusset member 4 and not viewed well from the external side. The fixing portion of the bracket 87 is not limited to the junction member 3a. That is, the bracket 87 may be fixed to the head pipe 26, the down tubes 3, or the gusset member 4.

The brake lines 80a, 80c, and 80d arranged along an under side of the gusset member 4 are respectively connected to the pipe connecting holes 85a, 85c, and 85d of the connecting member 81. The brake lines 80a, 80c, and 80d extend leftward from the respective connecting members 81a, 81c, and 81d at a width W and arranged in a triangular shape when viewed from a side thereof.

Brake hoses 90a, 90c, and 90d are respectively connected to the hose connecting holes 86a, 86c, and 86d. The brake hoses 90a, 90c, and 90d are formed of elastic members such as rubber, elastomers, and the like, and are formed to be freely curved.

The brake hose 90d extending from the uppermost connecting member 81d passes between the right down tube 3 and the gusset member 4. As shown in FIG. 2, the brake hose 90d is arranged along the head pipe 26 and the handlebars 29, and is connected to the front master cylinder 40 provided on the handlebar 29. The brake hose 90d is not tautly arranged, but is slightly loosened so that it can follow the steering of the handlebars 29. The brake hose 90d is supported on a hose stay 92 formed on a top bridge 27a of the front forks 27.

In addition, as shown in FIG. 9, the brake hoses 90a and 90c, extending from the respective connecting members 81a and 81c arranged at the lower side, are guided to the respective hose connecting holes 86a and 86c that are obliquely opened frontward and downward. These brake hoses 90a and 90c extend further forward after passing between the pair of the left and right down tubes 3, and are connected to the front brake caliper (not shown) installed on the front wheel 28 (see FIG. 1). As shown in FIG. 1, the brake hoses 90a and 90c are not tautly arranged, but are loosened to absorb the steering of the handlebars 29 or the expansion and contraction of the front forks 27 in the upward and downward direction. Further, the brake hoses 90a and 90c are supported by a hose stay 91 formed on the front forks 27.

According to the illustrative embodiment, the connecting port 81 is installed in the junction space 84 that is defined behind the head pipe 26, surrounded by the junction member 3a, the pair of left and right down tube 3, and the gusset member 4, and is substantially visually shielded from the external side. The connecting port 81 is provided for connecting the brake lines 80a, 80c, and 80d formed of the metal to the respective brake hoses 90a, 90c, and 90d formed of elastic material. In more detail, each of the connecting members 81a, 81c, and 81d has a length extending in a leftward and rightward direction. The connecting members 81a, 81c, and 81d are arranged in a stacked configuration along the down tubes 3.

The brake lines 80a, 80c, and 80d extend leftward from the connecting members 81 at a width W toward the junction space 84 formed in a triangular shape when viewed from a side portion and are respective connected to the pipe connecting holes 85a, 85c, and 85d such that they are arranged in a triangular shape when viewed from a side portion. By this arrangement, it becomes possible that the connecting port 81 and the connecting portions of the brake lines 80a, 80c, and 80d and the connecting portions of the brake hoses 90a, 90c, and 90d are not viewed from the side portion of the vehicle body by the junction member 3a, the pair of left and right down tubes 3, and the gusset member 4, and thus the external appearance can be improved.

Since the connecting port 81 of this embodiment is attached to the recessed web portion 3b of the junction member 3a, which connects the pair of left and right down tubes 3 and the gusset member 4 to the head pipe 26, through the bracket 87, there is no need to install a supporting member for attachment to a portion near the vehicle body frame 1. Further, the recessed web portion 3b is formed to be further depressed downward than the left and right down tubes 3, the connecting members 81 can be disposed to be substantially visually shielded by the down tubes 3, as viewed from the side portion of the vehicle body.

According to the motorcycle 100 of this embodiment, since the connecting port 81 is installed at the front junction space 84 of the vehicle body, a distance between the connecting port 81 and the front brake caliper 30, and a distance between the connecting port 81 and the front master cylinder 40 are reduced, and thus, lengths of the brake hoses 90a, 90c, and 90d can be minimized.

There is a need to connect the connecting port 81 to a fixing portion. In this embodiment, since the connecting port 81 is installed behind the head pipe 26 and thus the distance between the front brake caliper 30 and the connecting port 81 is reduced, the lengths of the brake hoses 90a, 90c, and 90d can be reduced. In addition, since the brake hoses 90a and 90c extend forwardly after passing between the left and right down tubes 3, and are connected to the front brake caliper 30, the lengths of the brake hoses 90a and 90c can be further shortened as compared with a case where the brake hoses 90a and 90c are arranged without passing between the left and right down tubes 3.

By minimizing the lengths of the brake hoses 90a, 90c, and 90d as described above, the lengths of the paths of the brake lines 80a, 80c, and 80d formed of the metal increase and thus the liquid loss caused by expansion can be suppressed. Further, the elastic brake hoses 90a, 90c, and 90d that can be freely curved are formed to have a sufficient degree of freedom with respect to the expansion and contraction of the front forks 27 in the upward and downward direction or the left and right steering of the front wheel 28 and to have excellent endurance and excellent manipulability of the handlebars 29.

In addition, by installing the connecting port 81 in the junction space 84, the brake hose 90d extending from the uppermost connecting member 81d to the front master cylinder 40 can be arranged along the head pipe 26 and the handlebars 29. Further, the brake hoses 90a and 90c extending from the respective connecting members 81a and 81c disposed at the lower side to the front brake caliper 30 can be arranged along the front forks 27 after passing through the pair of left and right down tubes 3. Therefore, the brake hoses 90a, 90c, and 90d can be arranged along the front forks 27 not to be viewed and thus the external appearance can be improved.

Since the brake control unit 37 that is relatively heavy is disposed at the rear-lower portion of the vehicle body frame 1, in more detail, in the protected space 50 between the lower cross pipe 38 and the down tubes 3 to be located near the vehicle body center, a distance from the front brake caliper 30 to the brake control unit 37 increases. Since the brake lines 80a, 80c, and 80d of this embodiment are arranged along the inner side of the right center frame 5 in the vehicle width direction, the lower side of the right part of the rear section 2b, the lower side of the crossmember 42, the lower side of the left part of the rear section 2b, and the lower side of the gusset member 4 such that a distance from the connecting port 81 to the brake control unit 37 can be the least distance, the lengths of the brake lines 80a, 80c, and 80d can be reduced and the costs can be reduced.

In addition, since the brake lines 80a, 80c, and 80d are arranged along the inner side or lower side of the vehicle body frame 1 in the vehicle width direction, the brake lines 80a, 80c, and 80d can be protected from the contact with a road and the like by the vehicle frame 1 when the motorcycle 100 tumbles over and thus the damage of the brake lines 80a, 80c, and 80d can be prevented.

The three brake lines 80a, 80c, and 80d are arranged to extend from the brake control unit 37 toward the front side of the vehicle body. Since the brake lines 80a, 80c, and 80d of this embodiment are bundled by the plurality of the clips 82 and thus can be one-touch-fixed by the pipe stay 83 on the lower side of the vehicle body frame 1, the pipe work can be easily performed and the neat external appearance can be attained.

As described above, according to this embodiment, since the connecting port 81, that connects the brake hoses 90a, 90c, and 90d to the respective brake lines 80a, 80c, and 80d is disposed behind the head pipe 26, the connecting port 81 is disposed so as to be substantially visually shielded from the external side. Accordingly, the external appearance can be improved. In addition, since the connecting port 81 is disposed behind the head pipe 26, closer to the front brake caliper 30 and the brake hoses 90a and 90c extending from the respective connecting members 81a and 81c to the front brake caliper 30 extend frontward after passing between the pair of left and right down tubes 3, the lengths of the brake hoses 90a and 90c extending to the front brake caliper 30 can be reduced or minimized. By reducing the lengths of the brake hoses 90a, 90c, and 90d, the lengths of the paths of the brake lines 80a, 80c, and 80d formed of the metal increase and thus the liquid loss caused by expansion can be suppressed.

In addition, according to this embodiment, the connecting members 81a, 81c, and 81d are arranged in the upward and downward direction and the brake hose 90d extending from the uppermost connecting member 81d is connected to the front master cylinder 40 provided on the handlebars 29. In addition, the brake hoses 90a and 90c extending from the respective connecting members 81a and 81c that are disposed at the lower side are connected to the front brake caliper 30. Therefore, the external appearance can be improved and the lengths of the brake hoses 90a, 90c, and 90d can be reduced. Further, since the brake lines 80a, 80c, and 80d are bound into a plurality of bundles and extend to come out through a rear side of the vehicle body, the external appearance can be improved and the piping work can be easily performed.

In addition, according to this embodiment, since the external appearance can be improved and the lengths of the brake hoses 90a, 90c, and 90d can be shortened, the lengths of the paths of the brake lines 80a, 80c, and 80d formed of the metal increase and thus the liquid loss caused by expansion can be suppressed even when rear ends of the brake lines 80a, 80c, and 80d are connected to the brake control unit 37 disposed at a rear side of the vehicle body and thus the distance between the front brake caliper 30 and the brake control unit 37 increases.

The above-mentioned embodiment is one aspect of the present invention, and may be appropriately modified without departing from the scope and spirit of the present invention.

For example, although a structure having the right brake lever 41 for the front wheel 28 and the brake pedal (not shown) for the rear wheel 33 is disclosed in each embodiment, it is also possible to provide a structure having a left brake lever for the rear wheel 33 on a left side of the handlebar 29 without the brake pedal.

In addition, although the front brake caliper 30 and the rear wheel brake (not shown) are provided in the above-mentioned embodiment, it is also possible to provide only one of the front and rear wheel brakes.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle comprising:
   a vehicle body frame comprising a head pipe disposed at a front portion thereof, a pair of front forks which are pivotally attached to the head pipe, and a pair of left and right down tubes that extend obliquely downwardly from the head pipe;
   a front wheel that is rotatably attached to the front forks;
   a front brake caliper operatively attached to the front forks;
   an engine attached to the vehicle body frame, wherein the down tubes extend under the engine;
   a connecting port disposed behind the head pipe for connecting a plurality of brake hoses to respective brake lines that are formed of metal;
   a plurality of brake hoses that are formed of elastic material, wherein the brake hoses extend from the connecting port forwardly to the front brake caliper after passing between the left and right down tubes; and
   a brake hydraulic control unit disposed at a rear side of the vehicle body frame, wherein rear ends of the brake lines are connected to said brake hydraulic control unit.

2. The motorcycle according to claim 1, wherein:
   the brake lines are bound into a plurality of bundles and extend outwardly through a rear side of the vehicle body frame;
   the connecting port comprises a plurality of connecting members arranged in a stacked configuration behind the head pipe;
   a first one of the brake hoses extends upwardly along the head pipe from one of said connecting members disposed at an upper portion of the connecting port, and is connected to a master cylinder provided on a handlebar; and
   a second one of the brake hoses extends downwardly along the front forks from another one of said connecting members disposed at a lower portion of the connecting port, and is connected to the front wheel brake caliper.

3. The motorcycle according to claim 1, further comprising a junction member which is integrally attached to a rear lower portion of the head pipe, and a gusset member attached to and extending rearwardly from the junction member;
   said junction member defining a junction between the head pipe, the left and right down tubes, whereby a junction space is formed at a portion of the vehicle body frame behind the head pipe and surrounded by the junction member, upper end portions of the left and right down tubes, and the gusset member;
   and wherein the connecting port is disposed in the junction space.

4. The motorcycle according to claim 3, wherein the brake hydraulic control unit comprises an electronic control unit.

5. The motorcycle according to claim 3, wherein the brake hydraulic control unit comprises an ABS modulator.

6. The motorcycle of claim 3, wherein the vehicle body frame further comprises a main frame member extending rearwardly from the head pipe, and a pair of spaced apart left and right medial frame members extending downwardly from the main frame member and connected to each other by an upper cross pipe, wherein lower end portions of the left and right medial frame members are welded to respective rear end portions of the left and right down tubes, and wherein the rear end portions of the left and right down tubes are interconnected by a lower cross pipe;
 wherein the left and right medial frame members and the upper and lower cross pipes cooperate to define a protected space therein;
 and wherein the hydraulic control unit is disposed in the protected space.

7. The motorcycle of claim 6, further comprising a support plate member that is welded to the lower cross pipe, and wherein the hydraulic control unit is affixed to the support plate member.

8. A motorcycle comprising:
 a vehicle body frame comprising a head pipe disposed at a front portion thereof, a pair of front forks which are pivotally attached to the head pipe, and a pair of left and right down tubes that extend obliquely downwardly from the head pipe;
 a front wheel that is rotatably attached to the front forks;
 a front brake caliper operatively attached to the front forks;
 an engine attached to the vehicle body frame, wherein the down tubes extend under the engine;
 a connecting port disposed behind the head pipe for connecting a plurality of brake hoses to respective brake lines that are formed of metal; and
 a plurality of brake hoses that are formed of elastic material, wherein the brake hoses extend from the connecting port forwardly to the front brake caliper after passing between the left and right down tubes, wherein:
  the brake lines are bound into a plurality of bundles and extend outwardly through a rear side of the vehicle body frame;
 the connecting port comprises a plurality of connecting members arranged in a stacked configuration behind the head pipe;
 a first one of the brake hoses extends upwardly along the head pipe from one of said connecting members disposed at an upper portion of the connecting port, and is connected to a master cylinder provided on a handlebar; and
 a second one of the brake hoses extends downwardly along the front forks from another one of said connecting members disposed at a lower portion of the connecting port, and is connected to the front wheel brake caliper.

9. The motorcycle according to claim 8, further comprising a junction member which is integrally attached to a rear lower portion of the head pipe, and a gusset member attached to and extending rearwardly from the junction member;
 said junction member defining a junction between the head pipe, the left and right down tubes, whereby a junction space is formed at a portion of the vehicle body frame behind the head pipe and surrounded by the junction member, upper end portions of the left and right down tubes, and the gusset member;
 and wherein the connecting port is disposed in the junction space.

10. The motorcycle according to claim 8, further comprising a brake hydraulic control unit disposed at a rear side of the vehicle body frame, wherein rear ends of the brake lines are connected to said brake hydraulic control unit.

11. The motorcycle according to claim 10, wherein the brake hydraulic control unit comprises a pipe-supporting member having a plurality of through holes formed therein.

12. The motorcycle according to claim 10, wherein the brake hydraulic control unit comprises an electronic control unit.

13. The motorcycle according to claim 11, wherein the brake hydraulic control unit comprises an ABS modulator.

14. The motorcycle of claim 10, wherein the vehicle body frame further comprises a main frame member extending rearwardly from the head pipe, and a pair of spaced-apart left and right medial frame members extending downwardly from the main frame member and connected to each other by an upper cross pipe, wherein lower end portions of the left and right medial frame members are welded to respective rear end portions of the left and right down tubes, and wherein the rear end portions of the left and right down tubes are interconnected by a lower cross pipe;
 wherein the left and right medial frame members and the upper and lower cross pipes cooperate to define a protected space therein;
 and wherein the hydraulic control unit is disposed in the protected space.

15. The motorcycle of claim 14, further comprising a support plate member that is welded to the lower cross pipe, and wherein the hydraulic control unit is affixed to the support plate member.

16. A motorcycle comprising:
 a vehicle body frame comprising a head pipe disposed at a front portion thereof, a pair of front forks which are pivotally attached to the head pipe, and a pair of left and right down tubes that extend obliquely downwardly from the head pipe;
 a front wheel that is rotatably attached to the front forks;
 a front brake caliper operatively attached to the front forks;
 an engine attached to the vehicle body frame, wherein the down tubes extend under the engine;
 a connecting port disposed behind the head pipe for connecting a plurality of brake hoses to respective brake lines that are formed of metal; and
 a plurality of brake hoses that are formed of elastic material, wherein the brake hoses extend from the connecting port forwardly to the front brake caliper after passing between the left and right down tubes; and
 a brake hydraulic control unit disposed at a rear side of the vehicle body frame, wherein rear ends of the brake lines are connected to said brake hydraulic control unit.

17. The motorcycle according to claim 16, wherein:
the brake lines are bound into a plurality of bundles and extend outwardly through a rear side of the vehicle body frame;
the connecting port comprises a plurality of connecting members arranged in a stacked configuration behind the head pipe;
a first one of the brake hoses extends upwardly along the head pipe from one of said connecting members disposed at an upper portion of the connecting port, and is connected to a master cylinder provided on a handlebar; and
a second one of the brake hoses extends downwardly along the front forks from another one of said connecting members disposed at a lower portion of the connecting port, and is connected to the front wheel brake caliper.

18. The motorcycle according to claim 16, further comprising a junction member which is integrally attached to a rear lower portion of the head pipe, and a gusset member attached to and extending rearwardly from the junction member;

said junction member defining a junction between the head pipe, the left and right down tubes, whereby a junction space is formed at a portion of the vehicle body frame behind the head pipe and surrounded by the junction member, upper end portions of the left and right down tubes, and the gusset member;

and wherein the connecting port is disposed in the junction space.

19. The motorcycle of claim 16, wherein the vehicle body frame further comprises:

a main frame member extending rearwardly from the head pipe;

a pair of spaced-apart left and right medial frame members extending downwardly from the main frame member and connected to each other by an upper cross pipe, wherein lower end portions of the left and right medial frame members are welded to respective rear end portions of the left and right down tubes, and wherein the rear end portions of the left and right down tubes are interconnected by a lower cross pipe; and a support plate member that is welded to the lower cross pipe;

wherein the left and right medial frame members and the upper and lower cross pipes cooperate to define a protected space therein;

and wherein the hydraulic control unit is affixed to the support plate member and disposed in the protected space.

* * * * *